United States Patent
Jain et al.

(10) Patent No.: US 10,608,992 B2
(45) Date of Patent: Mar. 31, 2020

(54) HYBRID HARDWARE-SOFTWARE DISTRIBUTED THREAT ANALYSIS

(71) Applicant: Microsoft Technology Licensing, LLC, Redmond, WA (US)

(72) Inventors: Navendu Jain, Seattle, WA (US); Ang Chen, Philadelphia, PA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 353 days.

(21) Appl. No.: 15/054,671

(22) Filed: Feb. 26, 2016

(65) Prior Publication Data

US 2017/0250953 A1    Aug. 31, 2017

(51) Int. Cl.
*H04L 29/06* (2006.01)
*G06F 21/56* (2013.01)
(Continued)

(52) U.S. Cl.
CPC .......... *H04L 63/0254* (2013.01); *G06F 21/55* (2013.01); *G06F 21/552* (2013.01);
(Continued)

(58) Field of Classification Search
CPC ............ H04L 63/0254; H04L 63/0218; H04L 63/0227; H04L 63/08; H04L 63/1408;
(Continued)

(56) References Cited

U.S. PATENT DOCUMENTS 7,376,755 B2    5/2008  Pandya
7,639,611 B2   12/2009  Hao et al.
(Continued)

FOREIGN PATENT DOCUMENTS

EP       1772992 A1      4/2007
WO    2006130840 A2    12/2006

OTHER PUBLICATIONS

Pei Cao et al "Efficient Top-K query calculation in distributed networks" PODC '04 Proceedings of the twenty-third annual ACM symposium on Principles of distributed computing pp. 206-215 (Year: 2004).*

(Continued)

*Primary Examiner* — Oleg Korsak
*Assistant Examiner* — Devin E Almeida

(57) ABSTRACT

Embodiments relate to detecting and mitigating network intrusions. Packets are inspected at their source/destination hosts to identify packet trends local to the hosts. The local packet trends are combined to identify network-wide packet trends. The network-wide packet trends are used to detect anomalies or attacks, which in turn informs mitigation actions. The local inspection may be performed by reconfigurable/reprogrammable "smart" network interfaces (NICs) at each of the hosts. Local inspection involves identifying potentially suspect packet features based on statistical prevalence of recurring commonalities among the packets; pre-defined threat patterns are not required. For network-wide coherence, each host/NIC uses the same packet-identifying and occurrence-measuring algorithms. An overlay or control server collects and combines the local occurrence-measures to derive the network-wide occurrence-measures. The network-wide occurrences can be used to automatically detect and mitigate completely new types of attack packets.

20 Claims, 12 Drawing Sheets

(51) Int. Cl.
*G06F 21/57* (2013.01)
*G06F 21/55* (2013.01)

(52) U.S. Cl.
CPC ............ *G06F 21/56* (2013.01); *G06F 21/577* (2013.01); *H04L 63/0218* (2013.01); *H04L 63/0227* (2013.01); *H04L 63/08* (2013.01); *H04L 63/145* (2013.01); *H04L 63/1408* (2013.01); *H04L 63/1416* (2013.01); *H04L 63/1425* (2013.01); *H04L 63/1441* (2013.01); *H04L 63/1458* (2013.01); *H04L 63/20* (2013.01)

(58) Field of Classification Search
CPC . H04L 63/1416; H04L 63/1425; H04L 63/63; H04L 63/1441; H04L 63/145; H04L 63/1458; H04L 63/20; G06F 21/55; G06F 21/552; G06F 21/56; G06F 21/577
See application file for complete search history.

(56) References Cited

U.S. PATENT DOCUMENTS

| | | | |
|---|---|---|---|
| 8,218,451 B2 | 7/2012 | Duffield et al. | |
| 8,220,054 B1 | 7/2012 | Lu | |
| 8,677,485 B2* | 3/2014 | Sharma | G06F 21/552 726/22 |
| 8,775,604 B2* | 7/2014 | Levow | H04L 29/12066 709/206 |
| 2003/0187999 A1* | 10/2003 | Callum | H04L 63/061 709/229 |
| 2004/0064568 A1* | 4/2004 | Arora | H04L 29/06 709/228 |
| 2005/0114706 A1 | 5/2005 | DeStefano et al. | |
| 2006/0036693 A1* | 2/2006 | Hulten | H04L 51/12 709/206 |
| 2006/0075489 A1* | 4/2006 | Ganguly | H04L 29/06027 726/22 |
| 2007/0088845 A1* | 4/2007 | Memon | H04L 47/10 709/234 |
| 2007/0280239 A1* | 12/2007 | Lund | H04L 45/04 370/392 |
| 2008/0104399 A1* | 5/2008 | Fascenda | H04L 9/3271 713/168 |
| 2008/0201772 A1 | 8/2008 | Mondaeev et al. | |
| 2008/0291915 A1* | 11/2008 | Foschiano | H04L 43/026 370/392 |
| 2010/0274893 A1* | 10/2010 | Abdelal | H04L 29/0602 709/224 |
| 2011/0196964 A1* | 8/2011 | Natarajan | H04L 41/0604 709/224 |
| 2012/0110665 A1* | 5/2012 | Abdul | H04L 63/1425 726/23 |
| 2013/0117809 A1* | 5/2013 | McDougal | H04L 63/1408 726/1 |
| 2014/0215562 A1* | 7/2014 | Roberson | H04L 63/1416 726/3 |
| 2015/0135263 A1* | 5/2015 | Singla | G06F 21/552 726/1 |
| 2015/0207706 A1* | 7/2015 | Li | H04L 67/02 709/224 |
| 2015/0215285 A1 | 7/2015 | Fleury et al. | |
| 2016/0036837 A1* | 2/2016 | Jain | H04L 63/1416 726/23 |

OTHER PUBLICATIONS

W-T Balke et al "Progressive distributed top-k retrieval in peer-to-peer networks" 21st International Conference on Data Engineering (ICDE'05) (Year: 2005).*

Hashmi, et al., "Hardware-Software co-design Architecture for Snort NIDS Detection Engine", In Proceedings of the First MMU-RD Science and Engineering Research and Development Conference, Dec. 2010, 6 pages.

John, Wolfgang, "Characterization and Classification of Internet Backbone Traffic", In Thesis for the Degree of Doctor of Philosophy, Feb. 2010, 242 pages.

Yu, et al., "Fast and Memory-Efficient Regular Expression Matching for Deep Packet Inspection", In Proceedings of ACM/IEEE Symposium on Architectures for Networking and Communications Systems, Dec. 3, 2006, pp. 93-102.

Pacheco, et al., "Decentralized, cooperative, and privacy-preserving Monitoring for trustworthiness", Published on: Oct. 15, 2012, Available at: http://fp7-demons.eu/wp-content/demons-d34.pdf.

Johnson, et al., "Network Anomaly Detection Using Autonomous System Flow Aggregates", In IEEE Conference on Global Communications Conference, Dec. 8, 2014, 7 pages.

Lin, et al., "Hardware-Software Codesign for High-Speed Signature-Based Virus Scanning", In IEEE Micro vol. 29, Issue 5, Sep. 2009, pp. 56-65.

Jain, et al., "Webview: Scalable Information Monitoring for Data-Intensive Web Applications", In Proceedings of 17th International World Wide Web Conference, Apr. 21, 2008, pp. 1-10.

"International Search Report and Written Opinion Issued in PCT Application No. PCT/US2017/018021", dated May 4, 2017, 11 Pages.

* cited by examiner

HYBRID HARDWARE-SOFTWARE DISTRIBUTED THREAT ANALYSIS

RELATED APPLICATIONS

This application is related to U.S. patent application Ser. No. 15/054,692, filed Feb. 26, 2016.

BACKGROUND

The proliferation of networks and devices communicating through them has been accompanied by a proliferation of intentional misuse and disruption. Devices reachable through networks are frequently subjected to denial-of-service (DoS) attacks, brute force attacks, port scans, malware distribution attempts, SSL (secure socket layer) attacks, botnet attacks, URL (Universal Resource Locator) redirection attacks, address spoofing attacks, and others. Many forms of network intrusion and disruption have long been known, and new threats will continue to emerge.

Network intrusion detection (NID) systems have been used to detect and prevent network-based attacks. Centralized NID systems place intrusion detection functionality at key points of a network, such as edge routers and access routers. Some NID systems operate at the application layer and are deployed at end hosts/servers. NID systems can create bottlenecks and often involve costly hardware and expensive, high-capacity network links to handle large amounts of data. Storing and processing large amounts of data with minimal impact on network performance can require significant hardware resources. Some NID systems route network traffic through external servers that sandbox or divert malicious traffic. Such third-party services are costly and risk potential security compromises.

Centralized NID systems also suffer from a limited view of network activity. Because packets are inspected at a limited number of points in a network, some packet data might not be analyzed by an NID system. Transformations such as address translation, tunneling, encapsulation, and link encryption, can cause packet data to be apparent at some points of a network and opaque at other network locations where NID devices are operating. In other words, not all of the potentially threat-related payloads and header fields that are active on a network will be parseable at the network junctures where NID devices reside.

Common NID approaches have other disadvantages. For example, most NID systems use a set of known attributes or contents of packets or flows to identify threats. When a new type of threat or attack emerges, a human network administrator might notice a problem, laboriously gather clues from network traces, taps, host log files, router logs, etc., consult with administrators of other networks, and take time to isolate the network attack and identify its characteristics. A new threat profile or pattern might then be manually added to an NID system to address a repeat of a similar attack in the future. This cycle of identifying new threats and updating NID systems is expensive, time-consuming, and reactive/never ending. In addition, new threats can do significant harm before they are detected and mitigated. NID systems that detect threats by inspecting packets for pre-defined threat profiles or patterns inherently lag present conditions, e.g., zero-day attacks on a network. Moreover, small modifications to a particular known attack can render it undetectable as its pre-defined pattern or regular expression may no longer be valid. Administrators and their tools must constantly adapt to safeguard network security and performance.

Embodiments discussed below address one or more needs such as efficiently and automatically detecting and mitigating network attacks or anomalies, in near real time, on potentially extensive and busy networks, in a distributed scalable manner, without relying on a priori definitions or indicia of particular attacks.

SUMMARY

The following summary is included only to introduce some of the concepts discussed in the Detailed Description below. This summary is not comprehensive and is not intended to delineate the scope of the claimed subject matter, which is set forth by the claims presented at the end.

Embodiments relate to detecting and mitigating network intrusions. Packets are inspected at their source/destination hosts to identify and analyze packet trends local to the hosts. The local packet trends are combined to identify network-wide packet trends. The network-wide packet trends are used to detect anomalies or attacks, which in turn informs mitigation actions. The local inspection may be performed in software or in hardware, e.g., via FPGAs (field programmable gate arrays), reconfigurable/reprogrammable "smart" network interfaces (NICs) at each of the hosts, etc. Local inspection involves identifying potentially suspect packet features based on statistical prevalence of recurring commonalities among the packets; pre-defined threat patterns are not required. For network-wide coherence, each host/NIC uses the same packet-identifying and occurrence-measuring algorithms. In some scenarios, these algorithms may differ and/or complement each other. An overlay or control server collects and combines the local occurrence-measures to derive the network-wide occurrence-measures. The network-wide occurrences can be used to automatically detect and mitigate completely new types of attack packets.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments discussed below relate to detecting and mitigating network intrusions. Discussion will begin with an overview of an architecture and process for inspecting in-transit packets at hosts, efficiently identifying local trends in the packets, identifying network-wide trends from the local trends, and initiating mitigation actions based on the network-wide trends. Some host and NIC features relevant to the architecture and process will be described next. This will be followed by discussion of packet inspection and feature extraction techniques that enable emerging threats to be detected without using pre-defined threat patterns or definitions. Methods to supplement packet analysis using descriptions of networking attributes of application software will then be explained. Described next are techniques for locally and efficiently capturing statistical information about arbitrary features of inspected packets to enable near real time identification of the top locally trending packet features. To that end, implementations that use approximate or probabilistic algorithms and data structures such as Count-Min (CM) sketches, loglog bitmaps, and others are explained. Described last is a process for identifying, from among the top locally trending packet features, the top globally trending packet features. While identification of globally trending packet features is itself useful, details are also provided for employing this information to automatically select and insert mitigation actions into a network.

Figure 1:
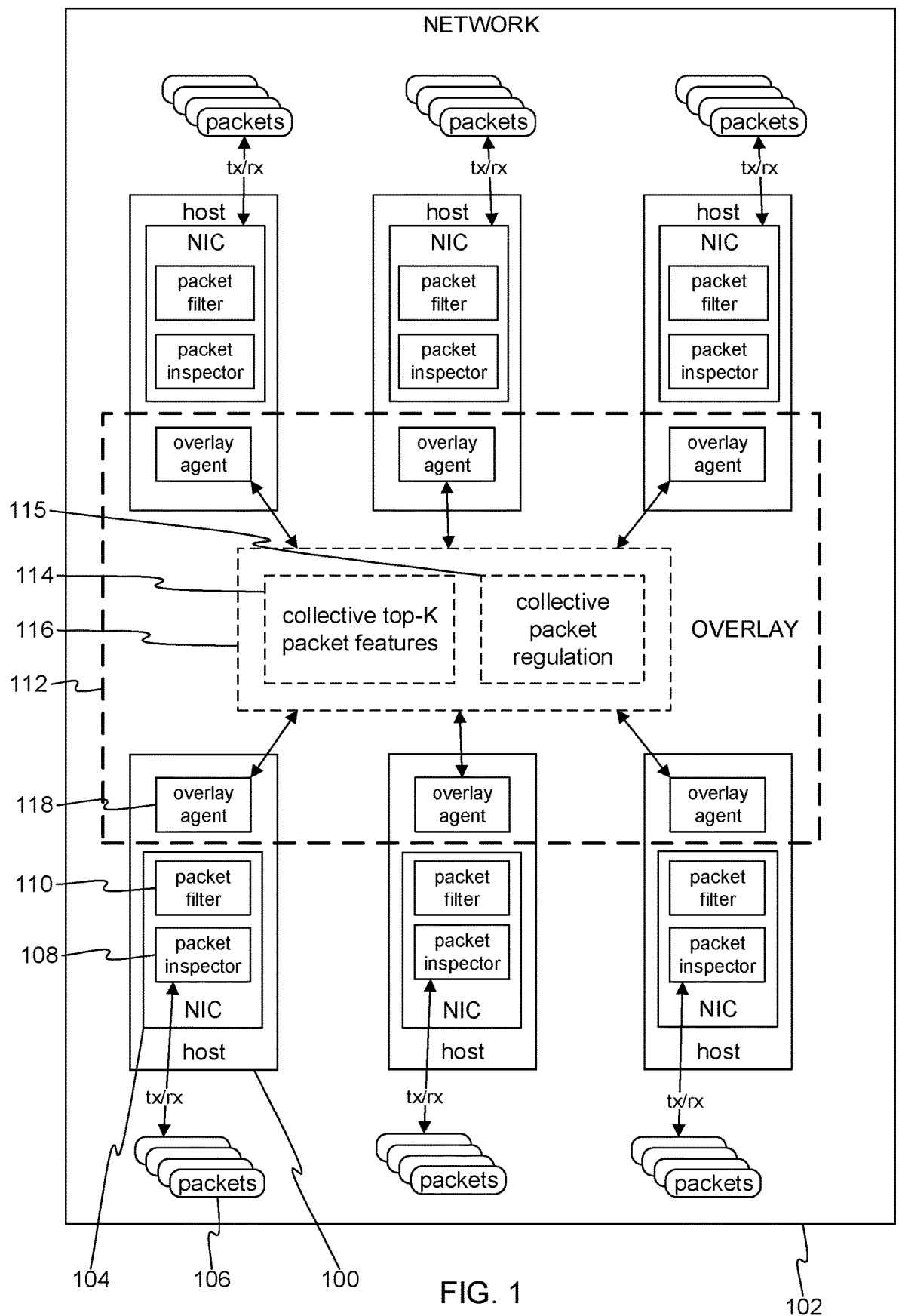
FIG. 1 shows hosts arranged to communicate with each other through a data network.

FIG. 1 shows hosts 100 arranged to communicate with each other through a data network 102. A host 100 may be any type of computing device that can operate as a network flow endpoint. The form of a host 100 is not important (e.g., a blade, server, workstation, laptop, etc.), but processing hardware (e.g., a CPU, graphics processing units, etc.), storage hardware (e.g., memory, disk drives, etc.), hardware for their cooperation (buses, input/output controllers and ports, etc.), and an operating system to control the hardware are assumed. For purposes herein, details of the data network 102 are not significant. For example, at the physical/link level, the data network 102 might include segments of shared medium (e.g., Ethernet), one or more switched fabrics (e.g. InfiniBand or Switched-fabric in Fibre Channel), token rings, etc. Any type of known data network 102 capable of providing network-level routing between the hosts 100 and other devices on external networks may be used. For discussion, the data network 102 will be assumed to be an Internet Protocol (IP) network that provides IP routing for the hosts 100, which have respective IP addresses assigned to them.

The hosts 100 are provided with respective smart NICs 104. The hosts 100 may have their own NICs (not shown), and the smart NICs 104 (which may also be referred to as "in-line NICs") are configured to intermediate network flows between the host NICs and the data network 102. The network flows can be Transmission Control Protocol (TCP)) flows, for example. The smart NICs 104 are able to exchange network packets 106 with the data network 102 via network-facing media/physical links and are able to exchange network packets with their respective hosts 100 via host-facing media/physical links to the host NICs.

As shown in FIG. 1, hosts 100 are able to communicate with each other and nodes outside the network 102 using the intermediated network flows. A smart NIC 104 of a host 100 will intermediate packets 106 of network flows 106 that terminate or originate at the host 100 (or transit through host 100, if it is acting as a peer in a peer-to-peer network). As described further below, the type of intermediation provided by a smart NIC 104 can include pass-through logic for transparently sending and receiving packets. Intermediation can also involve packet inspection performed by a packet inspection module 108 and packet filtering or regulating performed by a packet filter 110. The NICs 104 will be referred to as components of the hosts 100. In practice, the NICs 104 may or may not be physically incorporated into the hosts 100. While bump-in-the-line smart NICs will be convenient to implement embodiments described herein, other types of NICs can also be used. For instance traditional NICs lacking significant processing capability can be used, and NIC functions described herein can instead be performed by the processing hardware of the hosts 100. NICs with network-processing offload capabilities may also be used. Of note will be providing packet inspection and regulation at or near (in the connectivity sense) each of the participating hosts 100. Where actions are described herein as performed at or by hosts 100, such actions may, depending on the context, be performed by the NICs 104.

FIG. 1 also shows a distributed overlay 112. The overlay 112 includes network-wide collection and analysis functionality 114 to collect and analyze inspection data from the packet inspection modules 108 or 110. The overlay 112 also includes network-wide control functionality 115 to control the regulation of packets 106 by the NICs 104. The overlay 112 can be implemented as a client-server architecture or as a peer-to-peer network where the hosts 100 function as peers. With a client-server architecture, a network service 116 (e.g., one or more server devices) communicates with client overlay agents 118 at the respective hosts 100. For convenience, embodiments will be described herein in terms of a client-server architecture. Functionally equivalent peer-to-peer embodiments can be implemented using known distributed computing techniques in the overlay agents 118, which can be configured as cooperating peers.

Figure 2:
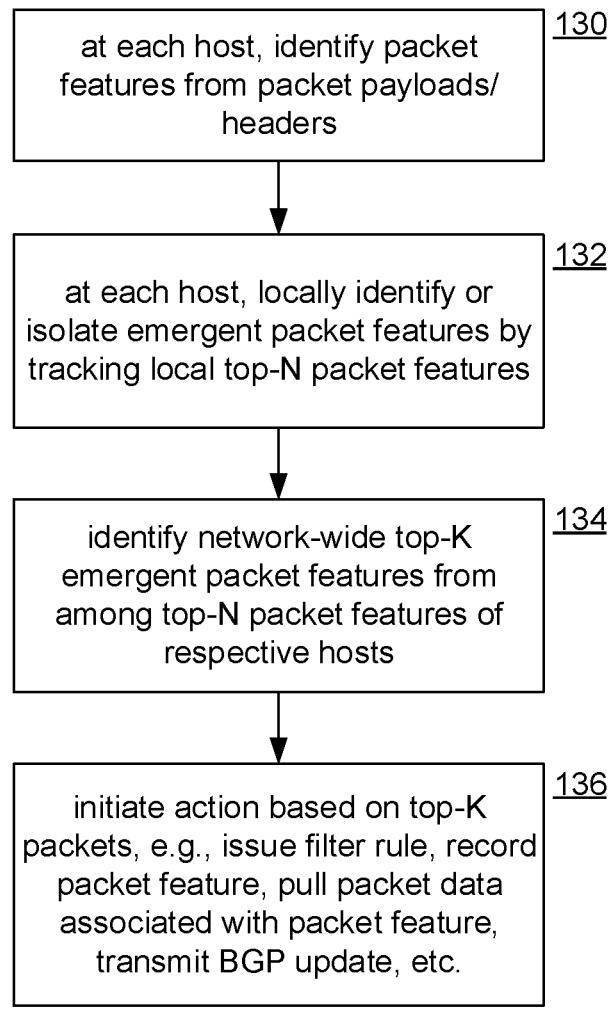
FIG. 2 shows a process performed by the hosts and an overlay.

FIG. 2 shows a process performed by the hosts 100 and overlay 112. At each host 100, the host's packets 106 are inspected to identify 130 packet features from headers and/or payloads of the packets 106. Packet features are discussed further below, but may include, for example, source and destination network addresses, hashes of payload contents, protocols, ports, payload sizes, packet counts, or others.

At each host 100, the identified packet features are locally monitored (at hosts) to identify or isolate 132 statistically significant emerging packet features at the hosts. This may involve, at each host, tracking statistics of packet features such as counts of features, cardinalities of features, counts and cardinalities of associations between features, rates of such statistics, rates/counts for time windows of varying duration, etc. In some embodiments described further below, for efficient storage, packet statistics are maintained using approximating algorithms and data structures. A basis for identifying a packet feature as potentially problematic may be its relative statistical rank among other packet features. For example, various local top-N packet features may be tracked at each host on a continuing basis. Some packet features that are inherent to packets or packet flows, such as recurring source IP addresses or payloads (regardless of the makeup of such payloads), can be identified without resort to pre-defined packet patterns or threat definitions. This technique can allow a host to identify, in near real time (e.g., within seconds) packet features based on their relative statistical significance rather than the particular values of those features. If a new type of attack is occurring, even if that type attack has never been previously recognized, that new attack may quickly "rise to the top" and become locally "visible".

Locally derived statistics of packet features are then collectively used to identify 134 the top packet features occurring among participating hosts 100 across the network 102. For a client-server implementation, this may involve collating reports or other indicia of local top-N packet features and identifying the top-K features among the collated data. For a peer-to-peer implementation, a distributed query may be performed to identify the top-K features.

The top-K packet features can then be leveraged in a number of ways, such as by initiating a mitigation action 136. As described further below, this might involve formulating and distributing packet filtering rules, rate control instructions, quality of service updates, transmitting routing redirect messages, invoking secondary security apparatuses such as firewall devices, pulling copies of locally cached packets corresponding to the top-K features, or logging a record of a top-K feature such as its identity, count or rate, time of occurrence, and so forth. It should be noted that the mere identification of a new packet feature or fingerprint (e.g., a payload pattern associated with an attack) is itself a useful mitigation action, as such identification can enable manual updating of any security or NID system, including those on other networks.

Figure 3:
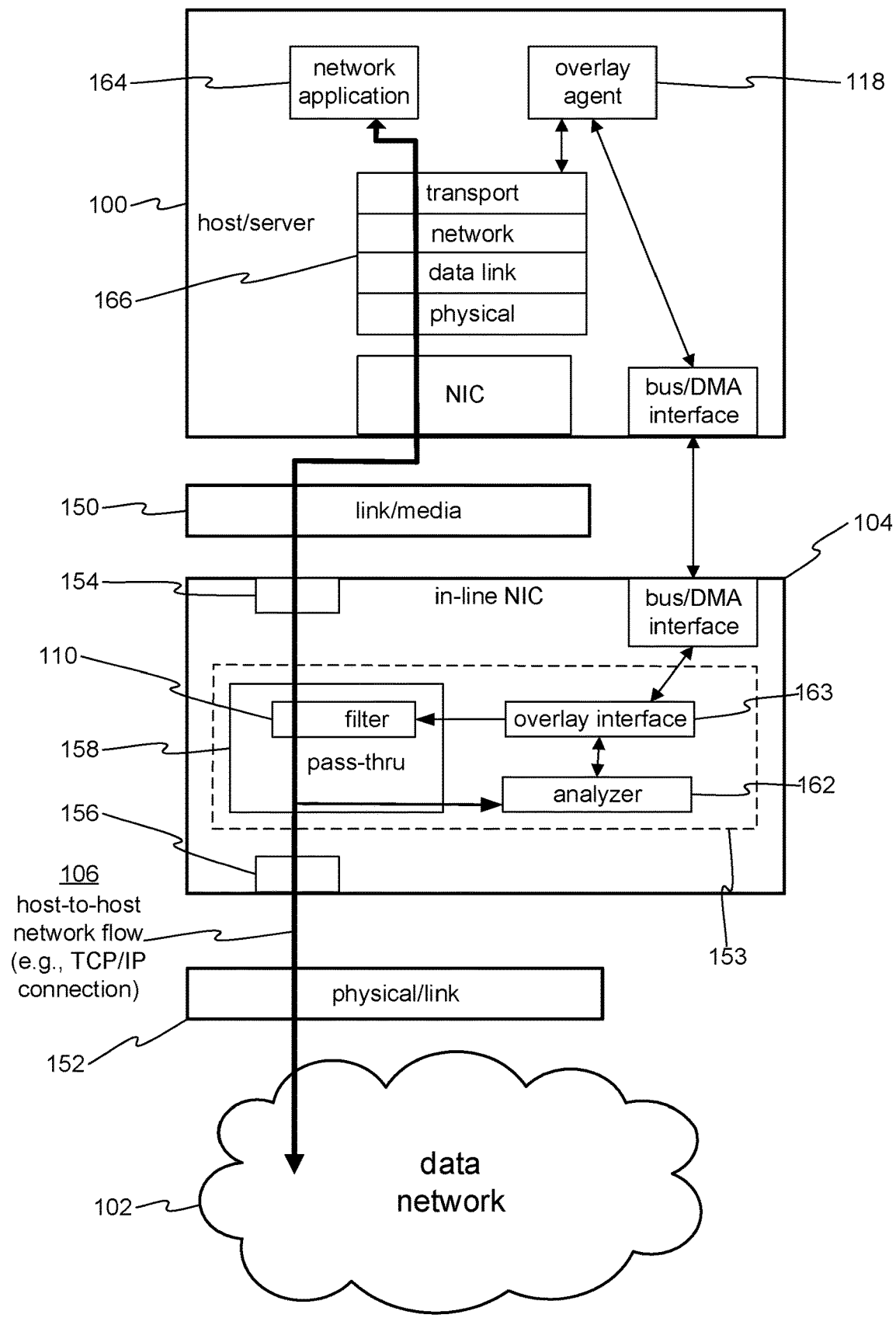
FIG. 3 shows an in-line network interface.

FIG. 3 shows an in-line smart NIC 104. As mentioned above, a smart NIC 104 may be arranged in-line between a host 100 and the data network 102 to provide pass-through connectivity between a host and the network (as used herein "in-line" is a term used to identify a type of NIC configuration and does not imply that such a NIC is presently connected to a host and network). A smart NIC 104 may connect to a first physical/link connection 150 physically connecting the smart NIC 104 with its host 100. The smart NIC also connects to a second physical/link connection 152 connecting the smart NIC to the data network 102. The physical/link connections may each be any type, for instance Ethernet, Fibre Channel, InfiniBand, PCIe, etc. A physical/link connection may also be a wireless medium. As discussed with reference to FIG. 3, the smart NIC is provided with media access controllers (MACs) 154, 156 to interface with the physical/link connections 150, 152.

To perform functions described herein, the smart NIC 104 may have a re-configurable or re-programmable section 153 such as a field programmable gate array (FPGA) or other form of programmable logic device. The programmable section 153 can be configured to implement components such as a pass-through component 158, which facilitates pass-through intermediation of packets 106 of network flows. The pass-through component 158 stores and forwards flow packets. The pass-through component 158 may also include a filter 110 to filter or regulate packets, an analyzer 162 to perform packet inspection, and an overlay interface 163 to enable participation in the overlay 112.

Network flows used by applications to exchange data may pass through the smart NIC as follows. A host-based application 164 (any application-layer code executing on a host 100) has application-layer data to convey, for instance hypertext transfer protocol (HTTP) messages. The data is passed through an operating system API/facility (e.g., a stream or socket) to a network stack 166, where the data is placed in transport packet(s) (e.g., TCP packets), which are encapsulated in network packet(s) (e.g., IP packets with the host's IP address as the sender), which are in turn placed in the payload(s) of physical layer frames (e.g., Ethernet frames). The frames are passed through the first physical/link connection 150 to the smart NIC 104.

The pass-through component 158 strips the network frames, stores the transport packets e.g., to extract the payload, possibly caches payloads for assembling and caching of high-layer data such as the IP packets, application-layer data, etc. The filter 110 applies regulating rules to the packets to possibly block, delay, or accelerate packets. The pass-through component 158 also provides the stripped/assembled packets/messages (of any of the available layers) to the packet analyzer 162. When buffered packets are ready to be sent (forwarded), the pass-through component 158 encapsulates them in an IP packet with the same source and destination addresses as the IP packets received from the host. The IP packets are then framed for the second link/media connection 152 and transmitted thereon. The IP packets transmitted by the smart NIC to the data network are generally the same as those originally received from the host. Hence, the smart NIC may be referred to as an "in-line" or "bump-in-the-line" device that is somewhat transparent to the host 100 and most elements of the network 102. If needed, however, packets can be modified as they pass through the smart NIC; inspection or analysis of such modified packets should not be affected if modifications are made at a suitable packet handling stage, for example, at a layer above a layer being inspected.

The packet analyzer 162 inspects the packets and updates its local packet statistics accordingly. Information about packet features identified by the packet analyzer 162 are passed to the overlay interface 163. The overlay interface 163 hooks the host/NIC into the overlay 112. Packet inspection information from the packet analyzer 162 is passed to the overlay agent 118, which forwards the packet inspection information to be coalesced and analyzed with inspection data from other of the hosts/NICs. The overlay agent 118 also receives instructions from the overlay 112. Such instructions might be packet inspection patterns (if being used), filter rules for the packet filter 110, and so forth. The overlay agent 118 and overlay interface 163 may communicate out-of-band through a bus or direct memory access (DMA) channel, or they may communicate in-band through the same host-to-NIC pathway used to convey the inspected packets 106. In one embodiment, the overlay agent 118 (or similar logic for participating in the overlay 112) is executed on the smart NIC rather than the host, if the smart NIC has facilities to operate as a flow endpoint by initiating connections, originating packets, etc. See U.S. patent application Ser. No. 14/752,713, titled "LIGHTWEIGHT TRANSPORT PROTOCOL", for additional details.

Flow packets 106 received by the smart NIC from the data network 102 are forwarded to the host in the same fashion, and the host's network stack 166 similarly provides the application data in the inbound packets to the host-based application 164. Notably, the in-line arrangement of the smart NIC and the bi-directional through-passing of packets allows a smart NIC and its host to use the same IP address. This can allow the host's smart NIC to be added or removed transparently to the host and to the routing of the data network.

Figure 4:
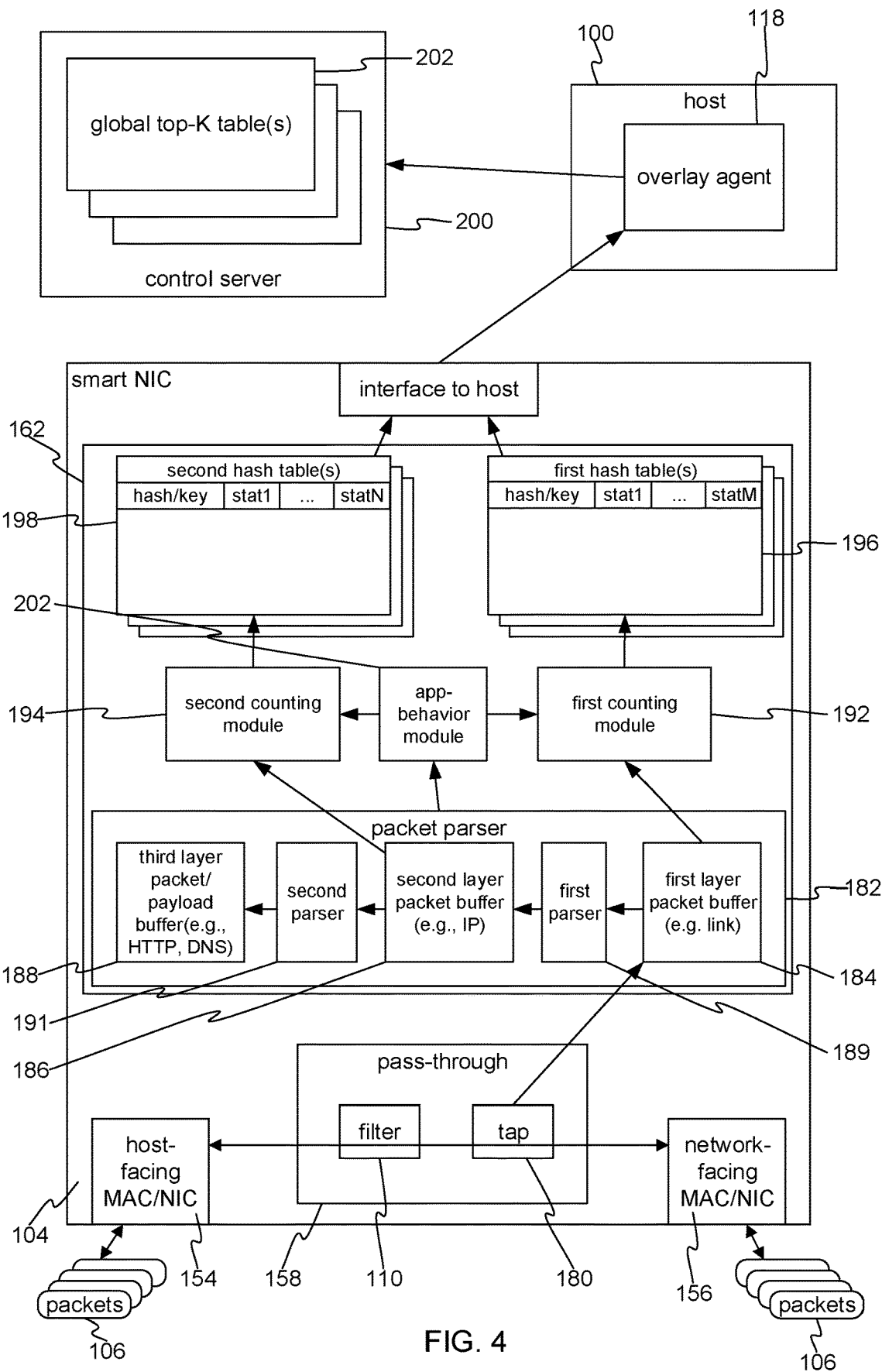
FIG. 4 shows details of a packet analyzer.

FIG. 4 shows details of the packet analyzer 162. As noted above, packets sent to and from a corresponding host are provided to the packet analyzer 162 as they transit the NIC. A logical tap 180 passes copies of packets or their locations in memory to the packet analyzer 162.

The packet analyzer 162 includes a packet parser 182 for parsing out parts of packets such as headers and payloads. The packet parser 182 has one or more buffers 184, 186, 188 and parsers 189, 191. The buffers 184, 186, 188 and parsers 189, 191 assemble packets up one or more layers of the network stack using known methods. For example, the first buffer 184 receives MAC/link level packets e.g., Ethernet. The first parser 189 assembles them into network packets (e.g., IP packets), which are stored in the second buffer 186. The second parser 191 extracts payloads from the network packets in the second buffer 186 and performs application-level parsing/assembly to obtain transport-level (e.g., TCP) and/or application-level data such as HTML messages or the like, which are stored in the third buffer 188. In one embodiment, application layer data is merely treated as a stream of data without regard for structure or format. Multi-level packet parsing is not necessary; only transport-layer packets, for example, might be inspected and statistically summarized. In sum, one or more layers of data passing through the NIC are presented for inspection and analysis.

Returning to FIG. 4, the contents of the buffers are passed to counting modules 192, 194. The counting modules identify arbitrary packet features of packets or data at different layers and update statistical data in respective tables 196, 198. If multiple layers are being assembled and inspected, then each layer may have a respective counting module and table. As packets flow through the NIC, statistical summaries of respective features of the packets are accumulated in the tables 196, 198. In one embodiment, rows with the lowest statistics are removed from the tables periodically or as they go below a threshold rank, count, age since last update, etc. Items in the tables 196, 198 may also be timestamped for computations of rates of packet feature occurrences and for removal of stale data. Periodically, the tables or subsets of the most statistically significant rows therein are provided to the overlay 112 through the overlay agent 118. A control server 200 receives the table updates and stores them in corresponding global tables 202. If multiple layers are being inspected and monitored, then each layer may have its own local tables and corresponding global tables. Multiple dimensions and combinations of statistics for a layer can be captured in multiple tables or other types of multi-dimension data structures. Statistics may also be tracked for correlations between features in different layers.

Figure 5:
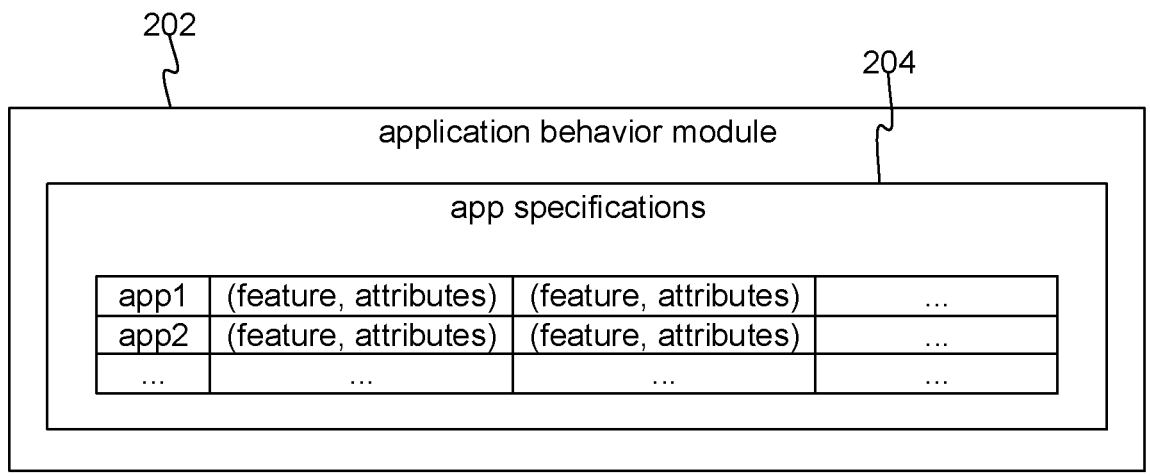
FIG. 5 shows an application behavior module that stores application behavior specifications.

As noted above, specifications of application behaviors can be provided to the packet analyzer 162. FIG. 5 shows an application behavior module 202 that stores the application behavior specifications 204 or files and uses that information to either perform its own statistical analysis or uses it to inform the other counting modules. An application can pass its specification in through the overlay interface 163. An application specification specifies how a corresponding application's network communications are expected to appear or perform. Specifically, an application specification may describe: where (e.g., offset and length, field number/type) and what a payload is expected to contain (e.g., digits, specific values), the content or frequency of header fields, expected statistical ranges of feature counts or rates in packets, content patterns or regular expressions, application level constraints (e.g., HTML messages should not include certain combinations or numbers of commands), a maximum expected number of concurrent flows, and so forth. Application features may be in terms of any network, transport, application layer or other layers. Features may be labeled with control tags to indicate a level of significance or type of action to take when a corresponding feature occurs or is violated. Actions can be for rate limiting, packet dropping, copying packets, re-directing or re-addressing, and so forth. Any of the features in the application specifications 204 can be statistically summarized in an ongoing manner using the same techniques described next for statistically summarizing arbitrary packet features. Specified application behaviors can be used, for instance, to exclude some packets from inspection, tallying, reporting, etc.

Figure 6:
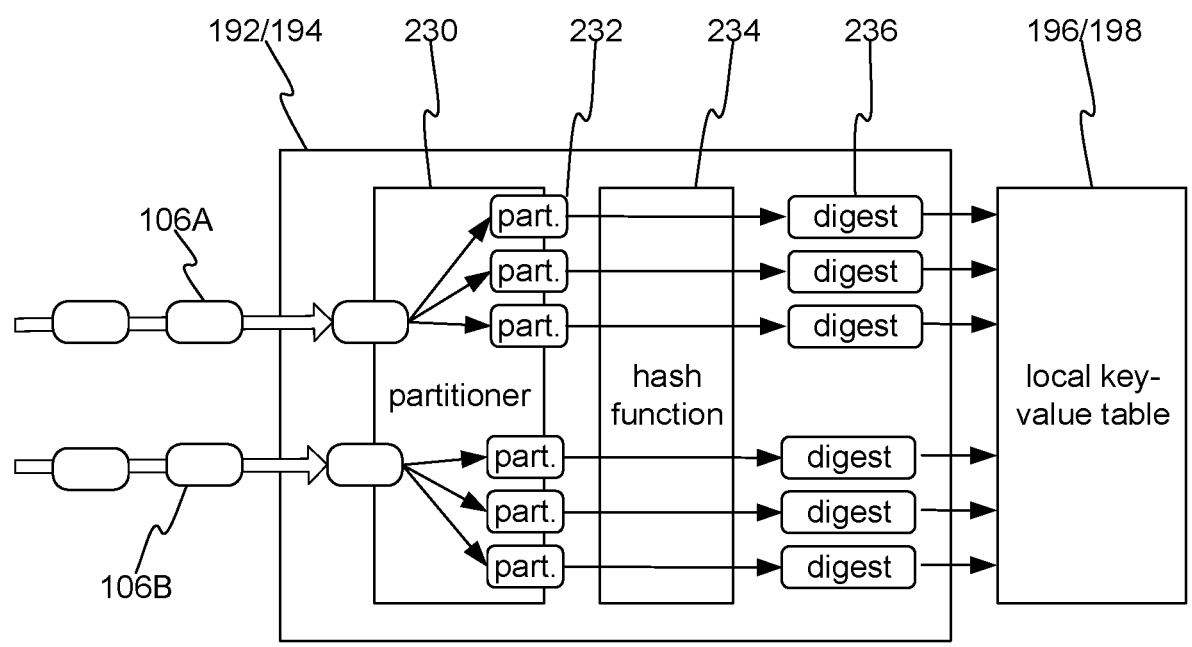
FIG. 6 shows an example of a counting module.

FIG. 6 shows an example of a counting module 192/194. Packets from one of the packet buffers are passed to the counting module. In one embodiment, the packets are split into headers 106A and payloads 106B. A partitioning module 230 computes one or more partitions 232 for the headers and payloads of each packet. A header partition might be a TCP/IP 5-tuple, an element thereof such as a source or destination IP address, or any other combination of one or more header fields. A payload partition can be any permutation of a payload, as discussed further below. The partitions are each passed to one or more hash functions 234 which output digests 236 (i.e., fingerprints, hashes, etc.) which in turn function as identifiers or keys for the corresponding packet partitions. A corresponding local key-value table is updated to add new keys and to update statistics (e.g., counts) for existing keys. The division between a counting module and a table is not important; in practice, they may be indistinguishable. Consider that some probabilistic techniques for capturing statistics of packet features represented by keys may not involve table structures per se and may involve a mix of special data structures and algorithms for accessing and updating the same. Nonetheless, approximating techniques may map between data dimensions in ways that mimic tables or provide the logical equivalent of a key-value(s) table.

Figure 7:
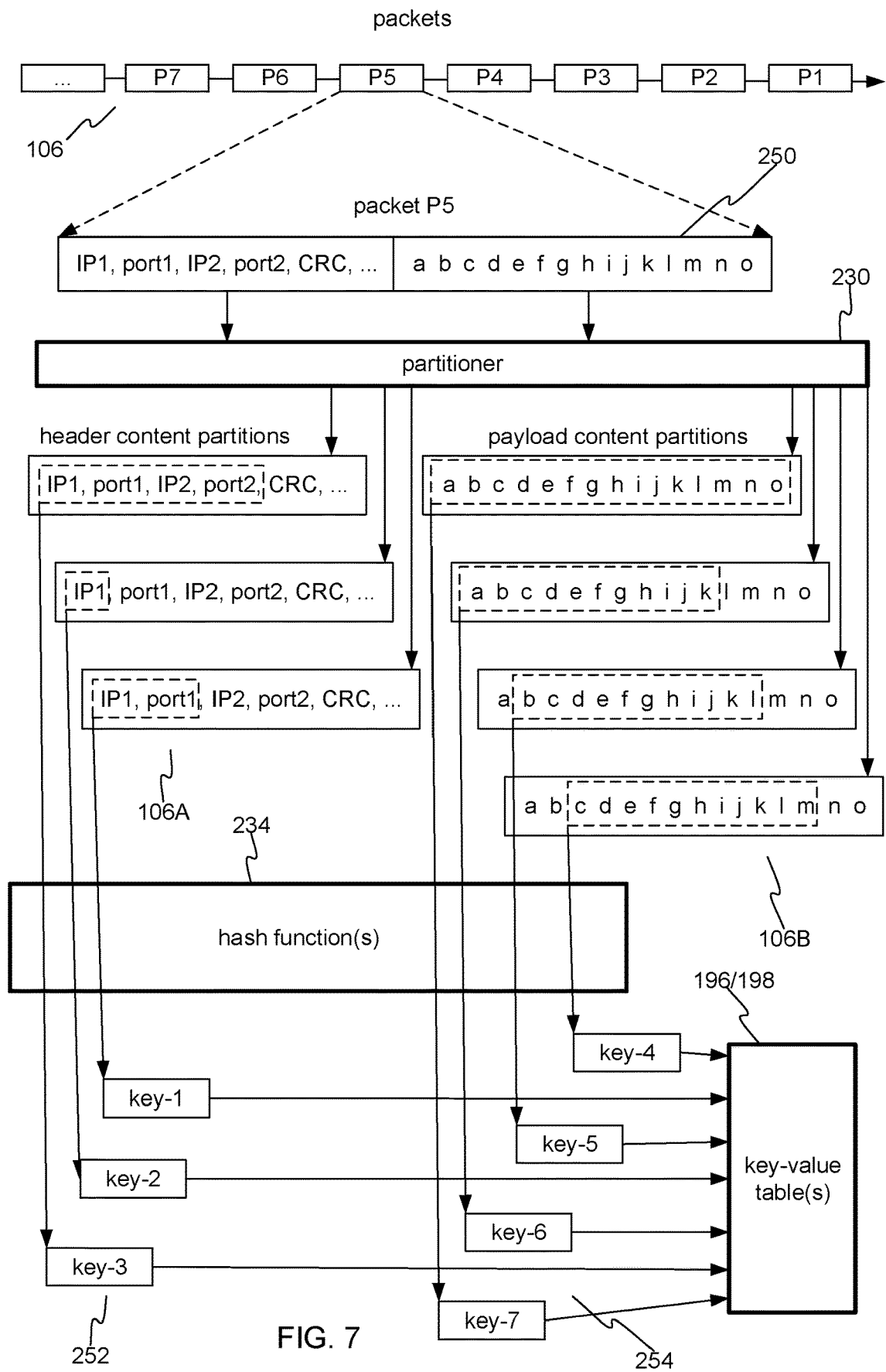
FIG. 7 shows additional detail of a counting module.

FIG. 7 shows additional detail of a counting module. Each packet 250 in a stream of packets is passed to the partitioner 230. The partitioner 230 applies one or more partitioning schemes or patterns to the packet 250 to obtain different corresponding content partitions of the packet. In the embodiment shown in FIG. 7, there are partitioning schemes for headers and payloads, which obtain header partitions 106A and payload partitions 106B. Conceptually, a partition scheme can be thought of as a template that can be applied to any packet to identify same parts of different packets (e.g., first three payload bytes, every other payload byte, middle eight payload bytes, overlapping four-byte strings, certain header fields, etc.).

Multiple partitioning schemes can be used for the whole packet, for the header, or for the payload. For example, from the same header, respective strings can be formed for: a 5-tuple, a source IP address, a source IP and protocol, a payload size and port number, etc. Similarly, the payload is divided into payload partitions 106B by any means, such as sliding windows, select chunks of the payload (e.g., every other 2 bytes/words), statistically chosen offsets and lengths of payload segments, a first number of bytes, a tailing number of bytes, and so forth. Partitions of entire packets or portions thereof without regard for packet structure such as headers and payloads can also be used. A partitioning scheme to obtain a partition that includes header and payload portions of a packet can be designed to exclude any header fields that normally change from packet to packet, such as checksums, sequence numbers, payload lengths, etc.

Although a single packet partitioning scheme can be used with effect (e.g., targeting only the payload), applying multiple partitioning schemes to obtain multiple content partitions of each packet increases the likelihood of counting and identifying recurrences of a same arbitrary unknown packet feature in many or perhaps all of the packets transiting the relevant NIC. If a same source address in headers, for instance, or a same subset of byte/bit values in a payload, or any other same literal values are recurring in same regions or fields of different packets, most occurrences of those literal values can be counted (embodiments using approximate counting/hashing might miss some occurrences). Moreover, by counting the same permutations of portions of content from different packets, attack packets that are changing can also be recognized. If a threat-indicating pattern in a payload is dynamically shifted over time, (e.g., shifted a few bits or bytes left or right in a payload), or if the threat begins to be sent from a new IP address, the threat is nonetheless automatically counted and becomes identifiable, since, as seen next, identification does not depend on the actual values of the threat, but rather on the fact that some values are recurring, possibly in combination with other values or packet features.

To help identify packet features that shift around within packets, when a recurring feature is detected at different locations, the changes in location can be used to guide the partitioning schemes. For example, if a packet feature is determined to always appear at certain offsets, those offsets can be used to dynamically adapt or add partitioning schemes.

Partitions of application-level data can also be used if available, as in the third buffer 188. If application-level data is reconstructed from the packets, partitions of that data can be designed. For example, if an HTML (hypertext markup language) document is reconstructed and stored in the third buffer 188, select tags can be found and their contents extracted for partitions. Any information about the application-level data, such as a protocol that it conforms to, or structure or format of the data, can be used to form partitioning schemes. Partitioning schemes can be formulated in any way, so long as the same partitions are being computed for the packets, at least over periods of time sufficient for accumulating meaningful comparative statistics. The partition-obtaining functions can be changed dynamically according to detected changing conditions such as average packet size. If partitioning functions are added and removed gradually, for instance one at a time, threat detection can continue with a minimal drop in the probability of detecting a recurring packet feature.

Although partitioning schemes can be used agnostically, i.e., on any packet, partitioning schemes can also be selected for packets based on information about the packets. For example, packets or frames or messages at different layers can be partitioned using respective different partitioning schemes. Even packets at a same layer can be selectively partitioned; partitioning schemes can be chosen based on features of the packets or their flows, state of the host or the NIC, control signals from the overlay 112, and so on.

Partitioning can also be performed across multiple packets in scenarios where a threat signature can potentially span packets. For instance, IP fragmentation can break an IP packet into multiple packets, which can be first assembled into the original large packet and then input to the partitioner module. There are flag settings in the IP header that can be accessed to detect if packets are fragments of a larger packet.

Although it is possible to store content partitions accessed from transiting packets, storage space can become problematic at high bandwidths. For efficient storage and statistical inspection, content partitions may be passed to one or more hash functions 234 to compute respective hashes/keys 252. Any number of known hash functions such as CRC32 can be used. The hashes/keys 252 are in turn stored, perhaps in a further-encoded form, in a hash table or other data structure.

The hashes 252 of partitions such as the partitions 106A, 106B serve as compact identifiers of the packet features. When such identifiers or hashes are used, discussion herein of operations involving "packet features" and equivalents may actually be performed using the hashes/identifiers as proxies for the packet features. Because each packet can potentially have multiple fingerprints (representing unique packet features), those packets can be compared to each other in multiple ways, statistically, without a priori information or patterns to look for in the packets. When the same partitioning, hashing, and counting functions are implemented by each host/NIC, comparative packet statistics can be evaluated globally, since a same arbitrary packet feature will be hashed and counted regardless of the NIC through which it passes. The tables at the hosts collectively function as a distributed hash table or similar distributed data structure. Commonalities among the packets passing to and from the hosts can be identified locally in near real time, and globally in near real time, perhaps even in a matter of seconds or minutes. Threats begin to be tallied and isolated as soon as they start to occur. A human administrator or threat analysis algorithm can use the statistics about commonalities and currently dominating trends to take actions or to improve security systems.

Figure 8:
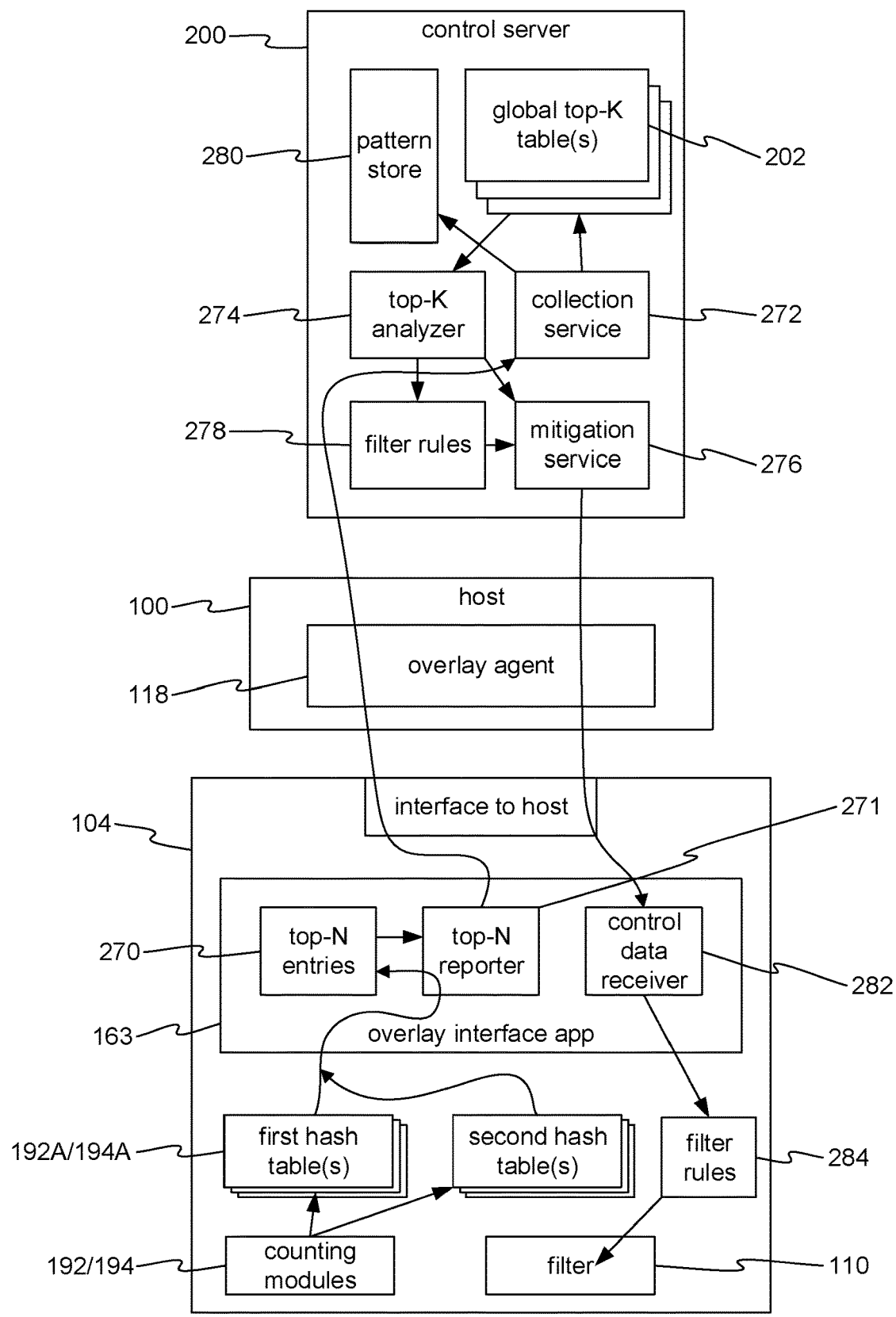
FIG. 8 shows an embodiment for integrating per-host packet inspection data to perform coherent network-wide packet inspection.

FIG. 8 shows an embodiment for integrating per-host packet inspection data to perform coherent network-wide packet inspection. As noted above, if the hosts and/or their NICs are each inspecting packets in a same partition space and a same hash/key space, the statistics at the hosts can be combined in a straightforward way. For instance, counts of a particular hash at each host can be added. As a host 100 collects statistics on packets in hash tables 192A/194A or other counting data structures, the local top-N entries 270 of packet features in one or more of the local tables are collected and sent by a top-N reporter 271 through the overlay 112 to the control server 200. A collection service 272 executing on the control server 200 receives the top-N entries 270 from respective hosts and stores them in the one or more global top-K tables 202. For an incoming key-statistic pair, if the key is not in the global table/view, then the key and its statistic are inserted. If the incoming key already has an entry in the global table/view, the entry's global statistic is updated with the incoming statistic.

If needed, the collection service 272 can be configured to receive or pull cached copies of relevant packets or portions thereof (for instance in buffers 184, 186, 188) based on keys in the global top-K data. For example, if a particular key is identified by the control server 200 as new or occurring at a rate beyond a threshold, that key can be sent in a request to any host/NIC that sent data for the key. The host receives the request, uses the key to lookup a corresponding cached copy of a packet, and returns the packet, statistics for that key or detail therefrom. The collection service 272 stores the packet data in a pattern store 280, which can be used for generating filters, an administrator's perusal of packet content, informing the packet inspection processes at the NICs, and so forth. In one embodiment, overlay agents 118, analyzers 162, or other components at a host can store copies of packets that correspond to the host's current top-K packet features; copies of the packets can be indexed using the hashes of the top-K packet features.

The collection service 272, the overlay agents 118, and the top-N reporters 271 can coordinate to coalesce the top-N/top-K packet feature data. The overlay agents 118 can cache data from the top-N reporters 271. The collection server 272 can pull top-K data when needed or periodically (e.g., ever 5 seconds). Alternatively, an overlay agent 118 can push packet feature statistics periodically or responsive to changes in its set(s) of local top-K rankings. In embodiments where the overlay agent 118 is application software executing on a hypervisor or operating system of its host 100, the overlay agent can cache an intermediary layer of statistics, such as top-M packet feature counts, which can reduce the resources required on the NIC 104. In one embodiment, the overlay agents 118 can form a collection hierarchy where some agents collect and forward the reports of other agents.

It is possible that a packet feature is occurring at low local rates but at a high proportion of hosts. Such a packet feature might in truth be in the top-K. To assure that the packet feature is provided to the control server 200, a value for N for the top-N logic can be selected that scales with the number of hosts, thus reducing the chance that the packet feature is not determined to be one of the top-K global packet features. For implementation details, refer to: Cao and Wang, "Efficient top-K query calculation in distributed networks", PODC '04; Balke, Nejdl, Siberski, and Wolf, "Progressive distributed top-k retrieval in peer-to-peer networks," ICDE 2005; Theobald, Weikum, and Schenkel, "Top-k query evaluation with probabilistic guarantees", VLDB '04.

In the overlay 112, a top-K analyzer 274 executes on the control server 200. The top-K analyzer 274 monitors the global packet feature data in the top-K tables 202. This can include shuffling out entries that fall out of the top-K range, generating and storing secondary data such as trending packet features or occurrences of pre-defined packet features that have been flagged for monitoring, providing an application programming interface to user interfaces for human operators to access the top-K data, and so forth.

Embodiments can be implemented to provide hosts/NICs with feedback control from the control server 200. A mitigation service 276 executing on the control server 200 monitors output of the top-K analyzer 274 (or the top-K tables directly) to automatically initiate mitigation actions, such as passing filter rule updates to a control data receiver 282 that accordingly updates a set of filter rules 284 used by the filter 110. Mitigation actions are discussed further below. In one embodiment, the top-K analyzer 274 also generates new filter rules stored in a filter rules store 278. New filter rules can be generated based on pre-fined security policies, the statistics in the top-K tables, indications of current network conditions such as congestion, and so forth. Filter rules can be formatted for, and sent to, any node on the relevant network or to nodes on other networks that might be administratively related or that might be identified as being relevant based on any of the collect packet information such as IP addresses, queried Domain Name Service (DNS) data, and so forth. It should be appreciated that any known mitigation techniques can be supplemented with the type of information obtainable by the collecting and monitoring of statistics of arbitrary packet features.

Figure 9:
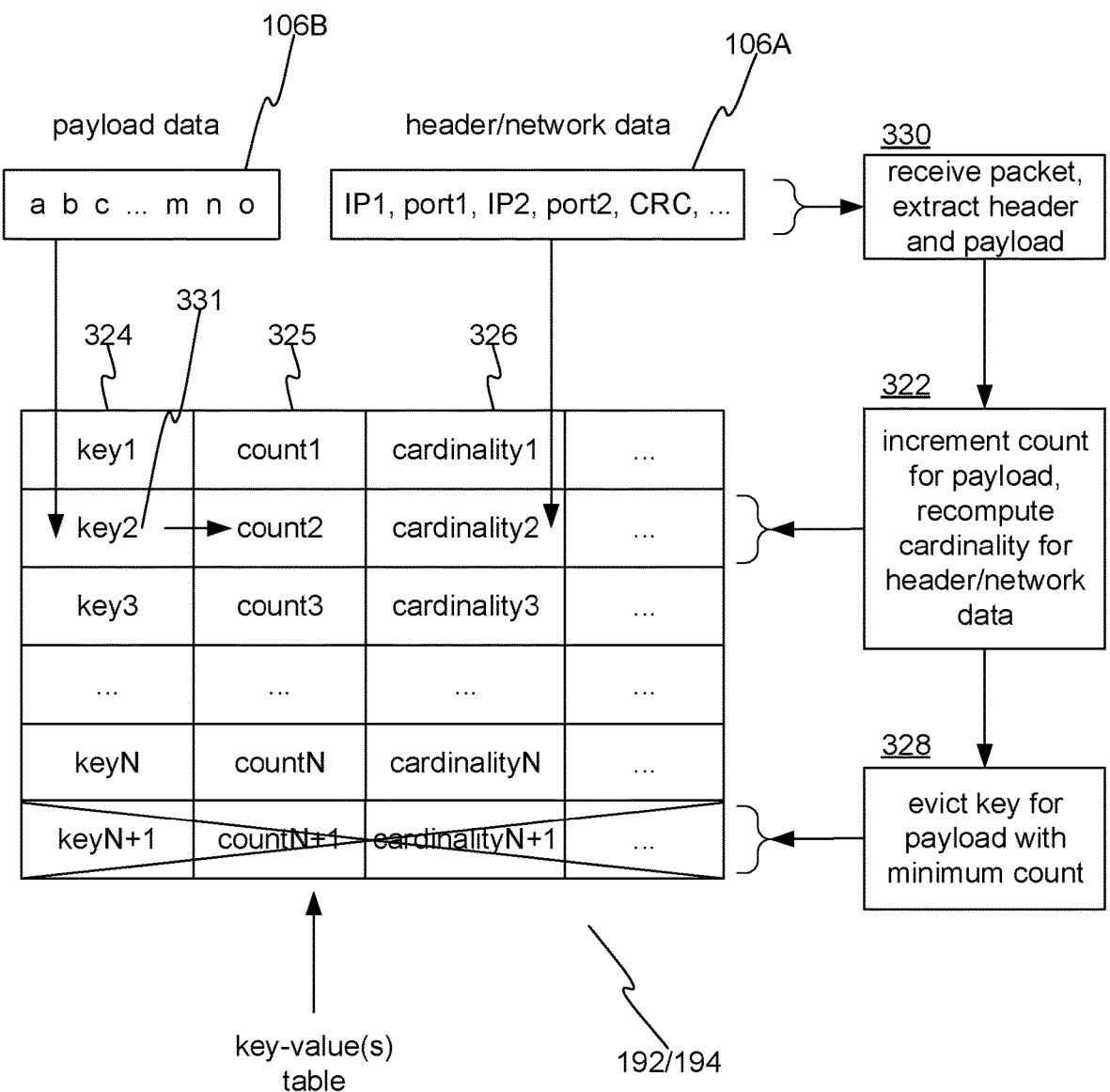
FIG. 9 shows an embodiment for maintaining top-K statistics.

FIG. 9 shows an embodiment for maintaining top-K statistics. The table has entries (rows) indexed by keys 324 (hashes) (in practice, a separate count-min module may stores keys 324). Each entry stores one or more statistics such as counts 325 and cardinalities 326 for a corresponding key. As discussed below, some of the statistics can be stored in the form of probabilistic data structures. A header 106A and payload 106B are received 330 and hashed or otherwise mapped to respective keys. For instance, the payload 106B is mapped to key2 in the hash table 192A/194A. Similarly, the header 106A is mapped to a key representing an IP address (e.g., source address IP2). With key2 331 as an index, a row for key2 is updated 322, which might include incrementing count2 and/or updating cardinality2 for the entry of key2. New rows are created when needed. The table can be kept to a manageable size by evicting 328 rows based on update recency (staleness), statistics in rows, rates of change, ranking heuristics that weight and combine different factors in the table or factors linked to rows in the table, and so on. In one embodiment, a set of current top-ranked entries are maintained by keeping track of which rows in the table currently have the highest values for one or more statistics. Different orderings of keys may be maintained as statistics update. For example, if each key has two statistics for two respective packet features, a first list of the keys ordered by the first statistic is maintained, and a second list of the keys ordered by the second statistic is also maintained. Top-K features can be obtained directly from such a list. In another embodiment, top-K features are obtained when needed by querying.

Figure 10:
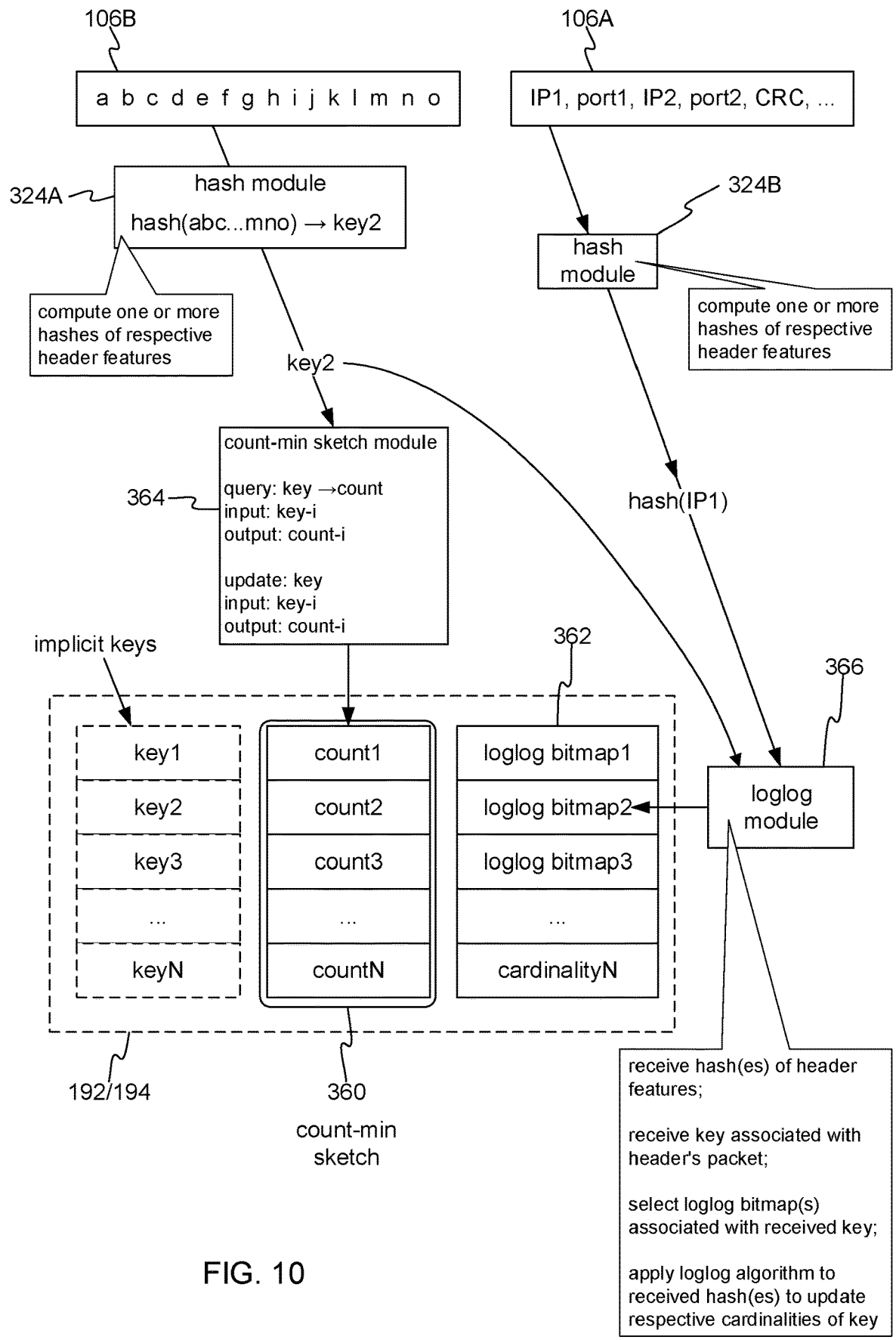
FIG. 10 shows an embodiment using approximate or probabilistic statistical gathering techniques.

FIG. 10 shows an embodiment using approximate or probabilistic statistic gathering techniques. A class of data structures and algorithms have been developed that, as appreciated only by the instant inventors, can be used to enable comprehensive packet inspection at near real time speeds with acceptable tradeoffs between hardware resources and reliability, meaning the probability that stored results equal ground truths. Any known approximate algorithms for mapping a key space to counts, cardinalities, averages, medians, and so forth can be used. For example, Bloom filters and its variations, bit maps, loglog counter, hyperloglog, linear counter with error, van Emde Boas data structures, etc.

In the example shown in FIG. 10, a count-min (CM) sketch 360 and loglog bitmaps 362 are used for accumulating packet feature statistics. CM sketches are probabilistic data structures that can count the frequencies of occurrences of unique events in data streams. Details of implementing loglog bitmaps and CM sketches are available elsewhere. Suffice it to say that a CM sketch stores keys and respective counts in a compact but "lossy" data structure with error bounded by probabilistic guarantees. Keys are not literally stored, rather, they are probabilistically encoded in the data structure of the CM sketch. A key can be queried and the frequency or presence of the key can be provided with predictable reliability. A loglog bitmap is another type of data structure that compactly stores statistics, namely, cardinalities. A loglog bitmap can efficiently store the number of unique items in a sample space. For example, for a packet feature such as a particular payload value (represented by a corresponding hash key), if it is desirable to track how man unique IP addresses have sent packets containing that payload value, a loglog data structure can store that information.

Returning to FIG. 10, if the packet 250 is received for processing by a packet analyzer 162, the header 106A and payload 1066 are extracted and hashed by hash modules 324A, 324B, which may or may not use a same hash algorithm. The hash module 324A hashes the payload or a partition thereof to key2, which is passed to a CM sketch module 364. The CM sketch module 364 accesses the CM sketch 360, and, implementing the CM sketch algorithm, updates the count (count2) for key2. Note that the sketch 360 depicted in FIG. 10 shows a logic set of data from a CM sketch. In practice, there may be a CM sketch and a separate top-K local table which explicitly stores the keys and their respective values, loglog info, etc., for a subset of the keys in the CM sketch. FIG. 10 shows a logical view of statistics related by keys/hashes. The CM sketch module 364 can also perform queries for any key. If a count for key2 is desired, the CM sketch module can return that value from the CM sketch 360 by using the CM sketch algorithm to lookup the value for a given key. The value of the count may be accurate within a predictable range or with a predictable probability.

The same keys (e.g. key2) used in the CM sketch 360 can be used as keys for other key-value data structures. In this way multiples pieces of data about a key/hash (packet feature) can be associated. For example, an associative array can have keys that are the same as the keys mapped by the CM sketch 360. Such an associative array can associate any values with its keys. For instance, an associative array can associate loglog bitmaps 362 with their respective keys. Whenever a packet feature hash (key) is being processed, the same key used to update the CM sketch 360 can also be used by the loglog module 366. The key is used to look up the associated loglog bitmap (e.g., bitmap2). A loglog module 366 then applies the IP address in the header 106A to the looked-up loglog bitmap, which consequently includes the new value in its IP cardinality estimation for key2. Multiple keys and multiple values of a packet can be associated, somewhat like a multi-dimensional data cube, but with a reduction in storage that is obtained with the compromise of a tolerable level of measurement errors. Following are some examples of how multiple key-values in collected data can be used.

An IP prefix/subnet can be used as a key to count the number of source IPs from that subnet sending traffic. More generally, this information can be collected at multiple granularities (e.g., subnets) to determine hierarchical heavy hitters. Similarly, IP prefixes belonging to known bad sites can be used in the form of a filter, or IP prefixes which are not routable or belong to a different region than where the packet got routed from, can be analyzed to check for IP spoofing. A CM sketch can also use source-port, destination-port, or their combinations, as the key, e.g., traffic to destination port 0 (reserved port) would directly imply an anomalous/bad traffic. Similarly, large traffic sent to service/application control ports (which typically see little communication or communication only from trusted end points/known servers) would indicate an attack pattern. The count of IP-port combinations can be input as a key to a loglog data structure to estimate the spread/diversity of incoming traffic—a large traffic spike from diverse IP, port combinations which have not been seen in the past would indicate a possible attack pattern.

Figure 11:
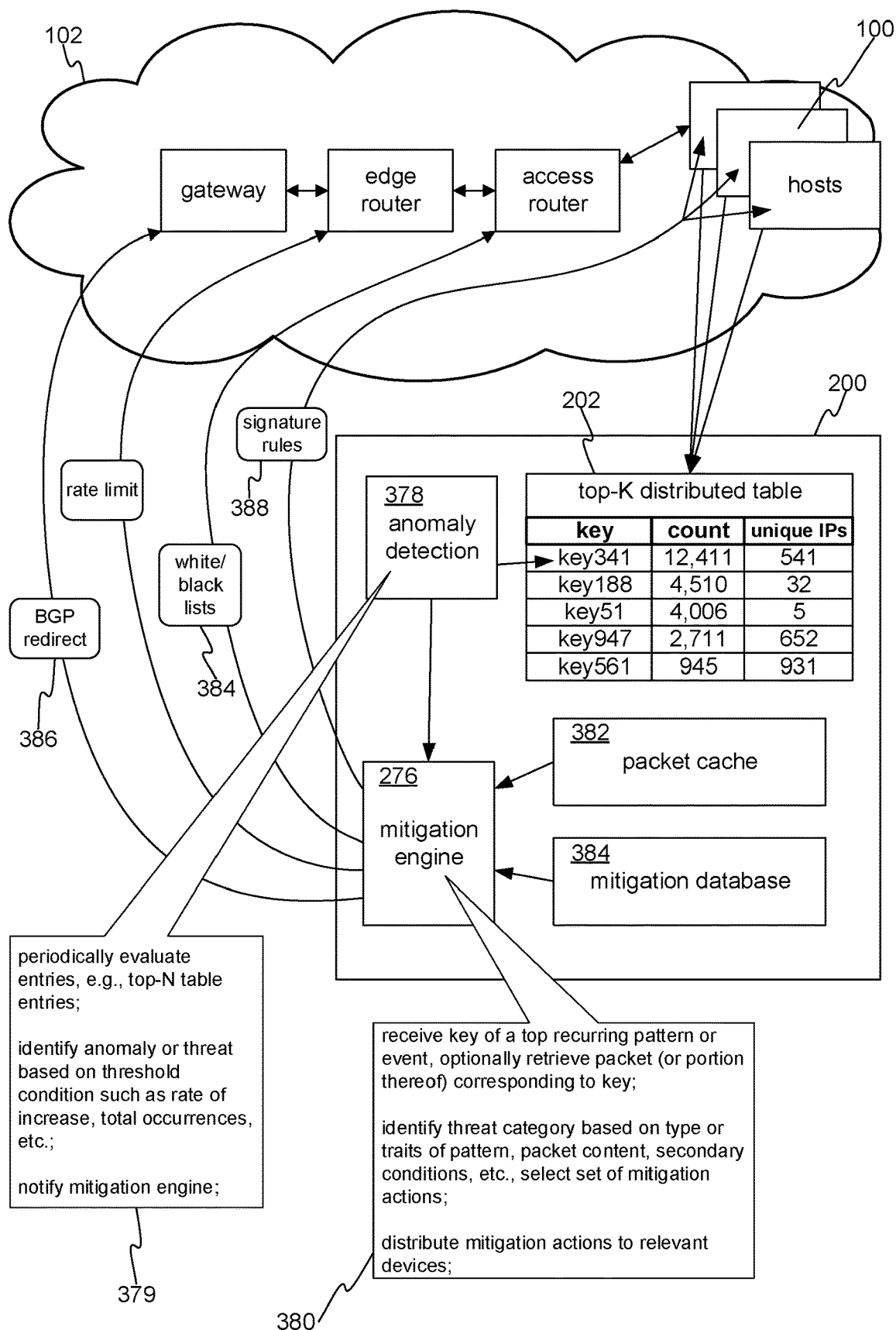
FIG. 11 shows details of an embodiment for automated mitigation.

FIG. 11 shows details of an embodiment for automated mitigation. As discussed above, measuring and collecting packet information can be useful for mitigating potentially problematic current conditions on a network, regardless of whether those conditions are induced by malicious activity. To this end, at the control server 200, an anomaly detection module 378 performs a detection process 379 of on-demand or periodically evaluating, for instance, the top-N entries to identify a threat or anomaly, and a mitigation engine 276 performs a mitigation process 380 to respond to the anomaly detection module 378.

Detection can be performed periodically or upon thresholds such amounts of traffic observed. Detection can also be performed on-demand or triggered externally for evaluation of the entries in the top-K table and information related to those entries. Known signal processing algorithms, machine learning methods, or the like, can be used to automatically identify unusual packet features or packet features correlated with prior events. Identification can be performed with less complex techniques, such as selecting entries with highest statistics, comparing statistics of entries with normalized thresholds, using time information to identify large rates or sudden rate increases, correlating the topmost statistically significant packet features with congestion signals, and so forth. When a key or packet feature is identified as a problem, the mitigation service 276 is notified.

The mitigation process 380 obtains information or traits of any detected threat or anomaly, perhaps represented by a key (packet feature), to determine which mitigation actions to take. Traits of an identified packet feature can be determined in many ways, for instance by payload contents, protocols or ports, known addresses, historical statistics of the packet feature, or leveraging external information such as blacklists of IP addresses known to have sent malicious traffic, etc. The relevant traits can be used, either by a defined policy or heuristically, to select a mitigation action. The traits can be provided to a trained or untrained classification algorithm to identify a category of threat or anomaly associated with the packet feature. Categories can be, for example, a level of importance (high, medium, or low), an attack category such as DoS or syn flood, an application level type of attack such as a particular HTTP attack, a spoofing attack, a failed network link or malformed route on the network, etc. Mitigation actions are formulated accordingly.

The traits, classes, etc., of a detected packet feature are used to select and possibly tailor mitigation actions in a mitigation database 384. Methods for mitigating attacks on networks are known; any prior methods may be appropriately adapted. New methods are also possible, and prior methods may be modified to take advantage of the new types of threat/anomaly information (and its immediacy) that are available using embodiments described herein. For example, although whitelists and blacklists are known, they are not known to have been automatically updated using packet inspection of application-level data, for instance, without pre-defined patterns or other a priori information. One mitigation action that the mitigation process 380 can perform is to generate white/black lists 384 in near real time, as well as update these lists with new detected patterns.

Although routing updates have been used to address traffic and attack issues, they have generally been used at network entry and bottleneck points. Rerouting actions have not been able to construct many different routing adjustments close to different respective hosts due to several reasons e.g., causing routing instability. The mitigation service can generate different BGP redirects 386, for instance, for different edge regions of the network. This can have advantages such as allowing legitimate traffic from a source to be properly routed when it is destined for one host (or port or protocol) on the network, while at the same time illegitimate traffic is redirected from that same source to a different end point e.g., traffic scrubber, when it is destined for another host (or port or protocol) on the network.

In embodiments where the inspection software/hardware at the hosts 100 and/or their NICs 104 are configured with filters or rate controllers, mitigation actions such as filter rules and signature rules 388 can be sent to inform control traffic or to inform the inspection processes. For example, if a packet feature is identified as anomalous, and an unusual port number or large number of unique ports is associated with the packet feature, update rules can be sent to force the packet analyzers 162 to count and possibly report packets having that port number. Filter rules can be sent to block packets having that port number. As another example, if application-level inspection of packet payloads is implemented, filtering or rate control rules can target those packets, possibly before the hosts are burdened with using CPU cycles to handle them. Any aspect of packet inspection can be informed with updates from the mitigation service 276, which can create a positive feedback cycle that improves detection, which in turn improves mitigation, and so on.

Embodiments described above can improve known mitigation techniques and can facilitate new types of mitigation techniques. Known mitigation actions or systems can be improved by pushing detected patterns (those having a high confidence of being anomalous) to upstream BGP (Border Gateway Protocol) routers or even the AS (autonomous system) from where the traffic is originating. Due to the improved timeliness or near real-time detection, the suspect traffic can be stopped as early as possible before it reaches the target. Detected patterns can also be published via real-time forums/messaging platforms like Twitter™, for quick dissemination to other parties to be aware of such "emerging" threats. In general, since little might be known about a new detected pattern, a conservative mitigation would be to rate limit the traffic and send that pattern for further analysis e.g., to human experts, or collect more traffic information like capture more packets of that type, to have higher confidence if it is anomalous or not. In parallel to rate limiting, traffic can be mirrored or copied, or only packets that are dropped by rate limiting might be copied. Packets matching a pattern can be re-routed to specific end points e.g., traffic scrubbers. Combinations of above techniques are also possible.

Although embodiments are described above using NICs to perform packet inspection, other designs can be used. A host with an ordinary "dumb" NIC can perform the inspection techniques described herein with software executing on the host's CPU, possibly within the host operating system's network stack. Generally, any arrangement for packet inspection on a per-host basis will be useful. Inspection activities referred to as "at" a host can be performed by any combination of hardware and software provisioned for each participating host. If hosts are in server racks, smart NICs might be inserted near a top-of-rack switch and connected to their respective hosts through link/media 150 connections (see FIG. 3).

The terms "top-N" and "top-K" refer to any type of subset of topmost members in a set. The "N" value may vary from host to host or may vary at each host over time. The "K" value may similarly vary over time. The "N" and "K" values may be the same or different; the different labels are intended to distinguish between local and collective data. The conditions that define a top-K/N set of packet features can vary. A top-K/N set of packet features can be a ratio of top packet features (e.g., the top one fifth), a fixed number of top packet features (e.g., the ten packet features with a highest count), packet features with statistic values above a threshold value, application-defined, etc. Moreover, packet features can be ranked, relative to each other, in a number of ways, and rankings can be the basis for determining a top-K/N set. Rankings can be determined by weighted combinations of attributes (e.g., classifications) and/or statistic values.

In yet another embodiment, a host/NIC can take mitigation actions without feedback from the overlay 112. When a type of packet feature and a frequency value thereof correspond to a known type of attack, such as a DoS attack, the host/NIC can locally initiate and apply filter rules independently, while optionally continuing to receive and count the packet feature. Later instructions from the overlay 112 might override or supplant the locally formed filter rule.

Although examples and embodiments have been described in terms of count-based statistics such as occurrences of a unique feature or a number of unique features associated with a packet feature, "statistical values" and similar terms also refer to time-variant measures of packet features, such as occurrences over a given period of time, changes in the number of occurrences over a given period of time (i.e., accelerating/decelerating packet features), and so on.

Where "each packet" or a similar "each" phrase is used herein, reference is made to each packet within an arbitrary set of packets that are being inspected. Not all packets to/from a host need be inspected at the host. Flows and/or packets can be selected for inspection randomly, at a given rate or ratio (e.g., every other flow, 25% of packets, M packets per unit of time, etc.), and so forth, based on an automatically or manually configured setting such as a particular network, IP address, protocol, etc. Unless context dictates otherwise, reference to "each" of a thing/event might not refer all instances of all such things/events on a relevant host, NIC, network, or overlay.

To aid in deconstructing emerging threats, correlations between packet features can also be tracked and identified. This can enable identification of "trigger" packets that signal an imminent threat (in the form of a subsequent high-occurrence packet feature).

Figure 12:
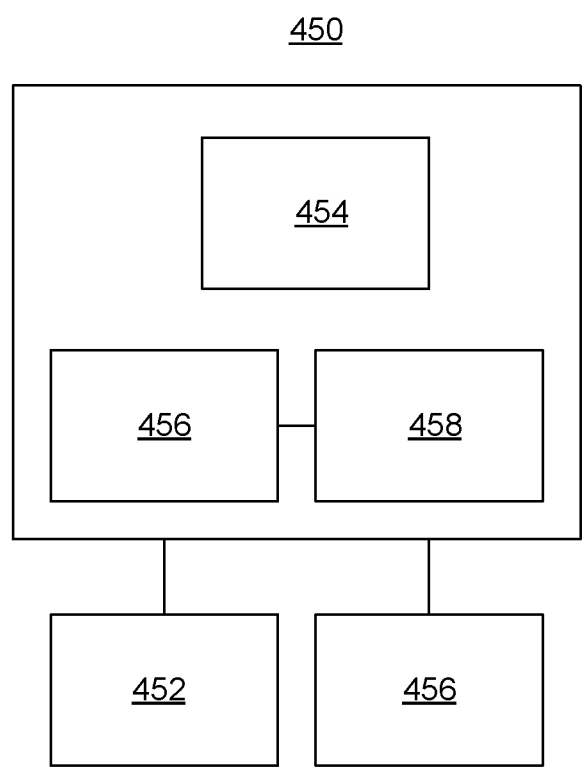
FIG. 12 shows details of a computing device.

FIG. 12 shows details of a computing device 450 on which embodiments described above may be implemented. The technical disclosures herein constitute sufficient information for programmers to write software, and/or configure reconfigurable processing hardware (e.g., FPGAs), and/or design application-specific integrated circuits (ASICs), etc., to run on one or more of the computing devices 450 to implement any of features or embodiments described in the technical disclosures herein.

The computing device 450 may have a display 452, a network interface 454, as well as storage hardware 456 and processing hardware 458, which may be a combination of any one or more: central processing units, graphics processing units, analog-to-digital converters, bus chips, FPGAs, ASICs, Application-specific Standard Products (ASSPs), or Complex Programmable Logic Devices (CPLDs), etc. The storage hardware 456 may be any combination of magnetic storage, static memory, volatile memory, non-volatile memory, optically or magnetically readable matter, etc. The meaning of the term "storage", as used herein does not refer to signals or energy per se, but rather refers to physical apparatuses and states of matter. The hardware elements of the computing device 450 may cooperate in ways well understood in the art of computing. In addition, input devices may be integrated with or in communication with the computing device 450. The computing device 450 may have any form factor or may be used in any type of encompassing device. The computing device 450 may be in the form of a handheld device such as a smartphone, a tablet computer, a gaming device, a server, a rack-mounted or backplaned computer-on-a-board, a system-on-a-chip, or others.

Embodiments and features discussed above can be realized in the form of information stored in volatile or non-volatile computer or device readable storage hardware. This is deemed to include at least storage hardware such as optical storage (e.g., compact-disk read-only memory (CD-ROM)), magnetic storage hardware, flash read-only memory (ROM), and the like. The information stored in storage hardware can be in the form of machine executable instructions (e.g., compiled executable binary code), source code, bytecode, or any other physical hardware having a physical state that can transfer information to processing hardware to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A first computing device to handle network flows through a network, the device comprising:
   a first media access controller (MAC);
   a second MAC; and
   processing hardware configured to:
      provide passthrough transmission of packets of the network flows by transmitting, from the first MAC, packets substantially as received by the second MAC, and/or by transmitting, from the second MAC, packets substantially as received by the first MAC,
      while the packets are passing between the first MAC and the second MAC, access a same partitioning of each of the packets, the accessing comprising, for each packet, accessing portions thereof that respectively correspond to the same partitioning;
      compute first local summary information of whatever arbitrary respective portions are in the accessed same partitioning by applying a hash function to compute hashes of the accessed portions, wherein, for each packet, hashes of the respective portions thereof are respectively computed, whereby multiple hashes are computed for each packet's respective portions;
      maintain counts of whichever hashes are computed, each hash's count corresponding to how many times the hash was computed by the first computing device; and
      at different times, transmit the first local summary information via the network to a second computing device that computes a global summary from the first summary information and from second local summary information computed by a third computing device, each first local summary information comprising the top-N counts at the corresponding time thereof, and each first local summary information further comprising the hashes of the respectively corresponding top-N counts.

2. A first computing device according to claim 1, wherein computing the first local summary information further comprises counting occurrences and/or computing frequencies of the hashes of the respective packets.

3. A first computing device according to claim 2, wherein the counting occurrences and/or computing frequencies is based on counting the hashes of the contents obtained from the multiple partitions.

4. A first computing device according to claim 1, wherein the first summary information comprises indicia of features identified by the first computing device as most frequently occurring at the first computing device, wherein the second summary information comprises indicators of features identified by the second computing device as most frequently occurring at the second computing device and comprises statistics of the respective indicators, and wherein the global view comprises a set of top-N most globally frequent features according to the combined first and second local summary information.

5. A first computing device according to claim 1, wherein the hash function comprises a probabilistic hash function.

6. A first computing device according to claim 1, wherein the third computing device transmits the second local summary information via the network to the second computing device, wherein the second computing device is the computing device that receives the first and second local summary information, wherein the first and third computing devices use a same algorithm to, respectively, locally identify topmost occurring packet features, and wherein the second computing device determines which packet features are topmost occurring among the first and third computing devices, and among other computing devices that implement the algorithm and that transmit corresponding local summary information to the second computing device.

7. A first computing device according to claim 1, wherein the first computing device comprises an in-line network interface card (NIC).

8. A first computing device according to claim 7, wherein the in-line NIC comprises a smart NIC.

9. A method for analyzing network communications, the method performed by a computing device configured to provide network connectivity to a network for a host, the computing device comprising memory and processing hardware, the method performed by the device comprising:
   performing, by the processing hardware, in-line packet inspection of packets sent to/from an interface of the host on the network, wherein each packet is inspected by the processing hardware computing hashes of respective portions thereof, wherein the portions of each packet correspond to a same partitioning, and wherein multiple hashes are computed for each packet;
   accumulating in the memory statistics of the computed hashes, respectively, wherein each hash has a respectively corresponding statistic computed by the processing hardware and stored in the memory, and wherein each statistic computed by the processing hardware corresponds to cumulative occurrences of, and/or frequency of, computations of a corresponding same one of the hashes computed from respective packets by the processing hardware; and
   via the network, repeatedly transmitting reports of the hashes, each report computed by the processing hardware and comprising whichever of the hashes have been determined by the processing hardware to have, among the statistics in the memory, the top-N statistics at times corresponding to the respective reports, wherein each transmitted report includes the cumulative statistics of its respectively corresponding hashes.

10. A method according to claim 9, wherein the hashes are computed using a probabilistic hashing or counting algorithm executed by the device, and wherein hashes of some respective packets have a same value and contribute to a same corresponding statistic.

11. A method according to claim 9, wherein the cumulative statistics in each transmitted report comprise real-time measures of occurrences of corresponding packet features.

12. A method according to claim 9, wherein the statistics correspond to cardinalities of respective unique packet portions, wherein the statistics are computed regardless of the literal content of the packet portions, and wherein the in-line packet inspection is performed for all, and only, packets sent to and from the interface.

13. A method according to claim 9, wherein each statistic corresponds to a same respective hash which identifies a same content found among the packets, and wherein any given statistic reflects occurrences of and/or a frequency of occurrences of, a corresponding content.

14. A method according to claim 9, further comprising accessing application specifications that specify attributes of applications executing on the device or on a host being provided access to the network via the device, and the accumulating the statistics is performed using the application specifications.

15. A method according to claim 9, wherein each report comprises hashes that are part of a distributed hash table distributed among hosts and/or their respective NICs, and wherein the hashes locally prevailing on the device at any given time are based on a local view of the distributed hash table.

16. A method according to claim 9, wherein the device comprises a host and/or a smart NIC of the host, the host having a network address that the packets are sent to and from via the network, and wherein the in-line packet inspection does not substantially alter the packets such that packets received by the device via the network are provided to the host without substantial alteration and such that packets sent by the host are transmitted to the network by the device without substantial alteration.

17. Storage hardware storing information configured to enable an apparatus comprising a host and/or a NIC to perform a process, the host and/or NIC comprising memory and a processor, the process comprising:
   maintaining in the memory a data structure that stores arbitrary identifiers of respective arbitrary packet features in association with respective occurrence measures of the arbitrary packet features, the arbitrary identifiers and occurrence measures computed by the processor;
   inspecting, by the processor, network packets sent to and/or from the host to compute the arbitrary identifiers from the arbitrary packet features therein, wherein the identifiers are computed by, for each inspected packet, computing hashes of respective portions of the inspected packet, and wherein each inspected packet's portions are accessed from a same partitioning thereof;
   each time an identifier is computed by the processor from a corresponding packet and the identifier is not in the data structure, adding, by the processor, the identifier to the data structure stored in the memory;
   each time an identifier is computed by the processor from a corresponding packet and the identifier is in the data structure, updating, by the processor, an occurrence measure, in the data structure, that is associated with the identifier; and
   selecting, by the processor, based on the occurrence measures, summary information of the identifiers in the data structure, the summary information comprising occurrence measures selected based on being topmost occurring among the occurrence measures, and transmitting the selected occurrence measures and their respective identifiers.

18. Storage hardware according to claim 17, the process further comprising:
   receiving a control instruction via the network, the control instruction having been sent based on the transmitted summary information of identifiers, and
   regulating, according to the control instruction, transmission of packets sent from the host.

19. Storage hardware according to claim 17, the process further comprising computing identifiers from at least two of: network-layer packets obtained from link/media frames, transport-layer packets obtained from network-layer packets, and application-layer data assembled from transport-layer packets.

20. Storage hardware according to claim 19, wherein the maintaining, inspecting, adding, updating, and computing the identifiers from the at least two layers are performed by the NIC, the NIC comprising an in-line network interface.

* * * * *